United States Patent [19]

Lippert

[11] Patent Number: 5,511,962

[45] Date of Patent: Apr. 30, 1996

[54] EXTRUSION DIE

[75] Inventor: Harry G. Lippert, Chippewa, Wis.

[73] Assignee: Extrusion Dies, Inc., Chippewa Falls, Wis.

[21] Appl. No.: 261,669

[22] Filed: Jun. 17, 1994

Related U.S. Application Data

[63] Continuation of Ser. No. 12,242, Feb. 1, 1993, abandoned.

[51] Int. Cl.⁶ .................................................. B29C 47/92
[52] U.S. Cl. ........................... 425/141; 425/143; 425/171; 425/173; 425/381; 425/466
[58] Field of Search ..................... 425/141, 143, 425/381, 133, 5, 171–173, 466, 467

[56] References Cited

U.S. PATENT DOCUMENTS

| | | | |
|---|---|---|---|
| 1,870,256 | 8/1932 | Lauterbur et al. | 425/172 |
| 1,977,515 | 10/1934 | Klippel | 425/172 X |
| 2,300,211 | 10/1942 | Eberlin | 264/216 |
| 2,712,155 | 7/1955 | Nelson | 425/466 |
| 2,859,475 | 11/1958 | Tornberg | 425/466 |
| 2,994,913 | 8/1961 | Holman | 425/172 |
| 3,018,515 | 1/1962 | Sneddon | 425/466 |
| 3,195,183 | 7/1965 | Phillips | 425/466 |
| 3,238,563 | 3/1966 | Hoffman | 425/466 |
| 3,680,997 | 8/1972 | Dukert et al. | 425/381 |
| 3,694,132 | 9/1972 | Bunte et al. | 425/466 |
| 3,706,518 | 12/1972 | Bunte et al. | 425/381 |
| 3,711,235 | 1/1973 | Bunte et al. | 425/466 |
| 3,804,569 | 4/1974 | Walker | 425/225 |
| 3,829,274 | 8/1974 | Melead | 425/466 |
| 3,832,120 | 8/1974 | Shaffer | 425/466 |
| 3,859,020 | 1/1975 | Rentz | 425/173 X |
| 3,870,454 | 3/1975 | Penrod | 425/466 |
| 3,940,221 | 2/1976 | Nissel | 425/141 |
| 4,057,385 | 11/1977 | Yazaki et al. | 425/466 |
| 4,197,069 | 4/1980 | Cloeren | 425/131.1 |
| 4,248,579 | 2/1981 | Maejima | 425/227 |
| 4,439,125 | 3/1984 | Dieckmann et al. | 425/172 X |
| 4,454,084 | 6/1984 | Smith et al. | 264/40.1 |
| 4,470,790 | 9/1984 | Harada et al. | 425/381 X |
| 4,533,510 | 8/1985 | Nissel | 264/171 |
| 4,659,302 | 4/1987 | Maejima | 425/190 |
| 4,753,587 | 6/1988 | Djordjevic et al. | 425/140 |
| 4,839,131 | 6/1989 | Cloeren | 264/171 |
| 4,863,361 | 9/1989 | Boos | 425/318 X |
| 4,978,289 | 12/1990 | Maejima | 425/141 |
| 5,020,984 | 6/1991 | Cloeren et al. | 425/141 |
| 5,259,747 | 11/1993 | Cloeren | 425/141 |
| 5,395,231 | 3/1995 | Maejima | 425/466 |

FOREIGN PATENT DOCUMENTS

| | | |
|---|---|---|
| 0084450A1 | 7/1983 | European Pat. Off. . |
| 579142 | 1/1994 | European Pat. Off. . |
| 2202484 | 7/1972 | Germany . |
| 2631099 | 1/1978 | Germany ............................ 425/466 |
| 4-338521 | 11/1992 | Japan ................................. 425/381 |
| 2092512 | 8/1982 | United Kingdom . |
| 2114050 | 8/1983 | United Kingdom . |

OTHER PUBLICATIONS

*News from the Cloeren Company*, Jul. 20, 1992.

*Primary Examiner*—Richard L. Chiesa
*Attorney, Agent, or Firm*—Marshall, O'Toole, Gerstein, Murray & Borun

[57] ABSTRACT

An extrusion die includes a die body defining a manifold therein terminating at an outlet and first and second relatively moveable plugs disposed in the manifold each having a plug edge where the plug edges together define a profile. The first and second plugs are moveable to first and second plug positions, respectively, in the manifold and indicators are disposed outside of the die body for indicating the first and second plug positions and the profile.

30 Claims, 4 Drawing Sheets

5,511,962

EXTRUSION DIE

This is a continuation of U.S. application Ser. No. 08/012,242, filed Feb. 1, 1993, now abandoned.

TECHNICAL FIELD

The present invention relates generally to extrusion apparatus, and more particularly to an extrusion die for producing a sheet or web of material.

BACKGROUND ART

Dies used in extrusion processes have long been used to produce a sheet or web of a formable material, such as a thermoplastic. In such a die, some provision is typically made to permit adjustment of the width of the formed product. In the past, this has been accomplished through the use of deckles mounted either within the die manifold or cavity or outside the die adjacent the die outlet. The deckles restrict material flow to a space therebetween and the positions thereof are adjustable to permit the width of the formed product to be controlled. Often, the deckles are shaped to minimize or eliminate a condition known as edge bead wherein the edges of the formed product are thicker than the remaining portions of the product.

Maejima, U.S. Pat. No. 4,659,302 discloses a T-shaped extrusion die including a pair of deckle structures disposed within the manifold on each side of the die for regulating the width of the extruded film. Each deckle structure includes a pair of inner deckles and an inner deckle rod. Each deckle rod includes a tip with a tongue-shaped protrusion for regulating the width of the film without forming edge beads at both edges thereof.

Maejima, U.S. Pat. No. 4,248,579 discloses a film extrusion die like that disclosed in the '302 patent described above, except that each pair of inner deckles is replaced by a single deckle and each deckle rod having a protrusion is replaced by a straight deckle rod without a protrusion.

When using deckles to regulate the width of an extruded product, it is usually necessary to stop extrusion of product through the die, open the die lip gap to permit movement of the deckles, adjust the deckle positions, readjust the die lip gap to the desired dimension, restart extrusion, observe the effect on the extruded product and readjust the deckle positions of the extruded product if unsatisfactory. Further, in the case of multi-component deckle systems like that disclosed in the '302 patent described above, the profiles of the internal deckles must often be adjusted by machining or other means in order to manufacture a suitable product. This adjustment of the deckle profile must be undertaken off-line before production, potentially resulting in the need to repetitively disassemble the die, adjust the deckle profiles and positions, reassemble the die and test the die operation before a suitable deckle profile and/or positions are found. To date, no satisfactory method has been found by which the deckle positioning and profile adjustment steps can be undertaken in a rapid and efficient manner either off-line or during manufacture of the extruded product.

In addition to the foregoing, extrusion dies are often used to extrude materials which are corrosive, particularly at high extrusion temperatures. The corrosive nature of some materials result in pitting and deterioration of the die surfaces, particularly the portion of the die forming the die outlet, resulting in the need to repair and/or remanufacture the die. Still further, it is sometimes necessary to modify the die outlet to achieve proper flow of a particular product. In the past, such repair or modification results in significant down time and considerable expense.

In addition, it is necessary to provide some type of sealing apparatus at the point where the rods supporting the internal deckles exit the die body. Such sealing is difficult to achieve, particularly given the corrosive nature of the extruded material and the high temperatures at which the die body is maintained.

SUMMARY OF THE INVENTION

In accordance with the present invention, an extrusion die permits quick and efficient manufacture of extruded polymers and simple maintenance.

More particularly, in accordance with one aspect of the present invention, an extrusion die includes a die body defining a manifold therein terminating at an outlet and first and second relatively movable plugs disposed in the manifold each having a plug edge wherein the plug edges together define a profile. Means extend through the die body for moving the first and second plugs to first and second plug positions, respectively, in the manifold. Means are disposed on the moving means outside of the die bodies for indicating the first and second plug positions and the profiles.

In accordance with a preferred form of the present invention, the moving means comprises first and second rods which carry the first and second plugs. The indicating means preferably comprises first and second members mounted on the first and second rods, respectively. Also preferably, the first and second members include first and second indicating edges wherein the first and second indicating edges are substantially identical in shape to the plug edges of the first and second plugs, respectively.

Also in accordance with the preferred embodiment, a deckle rod is disposed in the manifold and is movable with respect to the first and second plugs. Preferably, the deckle rod is carried by the moving means. A third movable plug may also be provided which is moved by the moving means to a third plug position in the manifold wherein the indicating means further indicates the third plug position.

Still further in accordance with the preferred embodiment, the first and second rods extend through first and second bores in the die body wherein each bore is of a size larger than the rod extending therethrough such that a space is disposed therebetween wherein material flowing through the manifold can flow into and seal off the spaces between the rods and the bores.

In accordance with a highly preferred form of the present invention, the outlet is of an adjustable size and means are provided for controllably adjusting the outlet size. The adjusting means preferably comprises a thermally-responsive member coupled to a hinged member of the die body and a thermal element in heat-transfer relationship with the thermally responsive member wherein transfer of heat between the thermal element and the thermally responsive member causes movement of the hinged member. Optionally, the die body may include replaceable lip inserts which define the outlet of the die body.

In accordance with a further aspect of the present invention, an extrusion die includes a die body having a manifold therein terminating at an outlet and first, second and third relatively movable plugs disposed in the manifold each having a plug edge. First, second and third rods extend through the die body and support the first, second and third plugs at first, second and third plug positions, respectively, in the manifold. First through third indicating members are disposed on the first through third rods, respectively, outside of the die body for indicating the first through third positions.

In accordance with another aspect of the present invention, an extrusion die includes a die body defining a manifold therein terminating at an outlet of an adjustable size wherein the die body includes a hinged member which is movable to adjust the outlet size and first through third relatively movable plugs disposed in the manifold each having a plug edge wherein the plug edges together define an edge profile. A deckle rod is disclosed in the manifold and is movable with respect to the first through third plugs. First through third rods extend through the die body and support the first through third plugs at first through third plug positions in the manifold. First through third indicating members are disposed in the first through third rods outside of the die body for indicating the first through third plug positions and the edge profile. Means are provided for controllably adjusting the outlet size including a thermally-responsive member coupled to the hinged member and a thermal element in heat-transfer relationship with the thermally responsive member wherein transfer of heat between the thermal element and the thermally responsive member causes movement of the hinged member.

As noted above, the extrusion die of the present invention permits adjustment of the width of an extruded product and, in addition, offers various features which minimize down time and improve production efficiency.

DESCRIPTION OF THE PREFERRED EMBODIMENT

Figure 1:
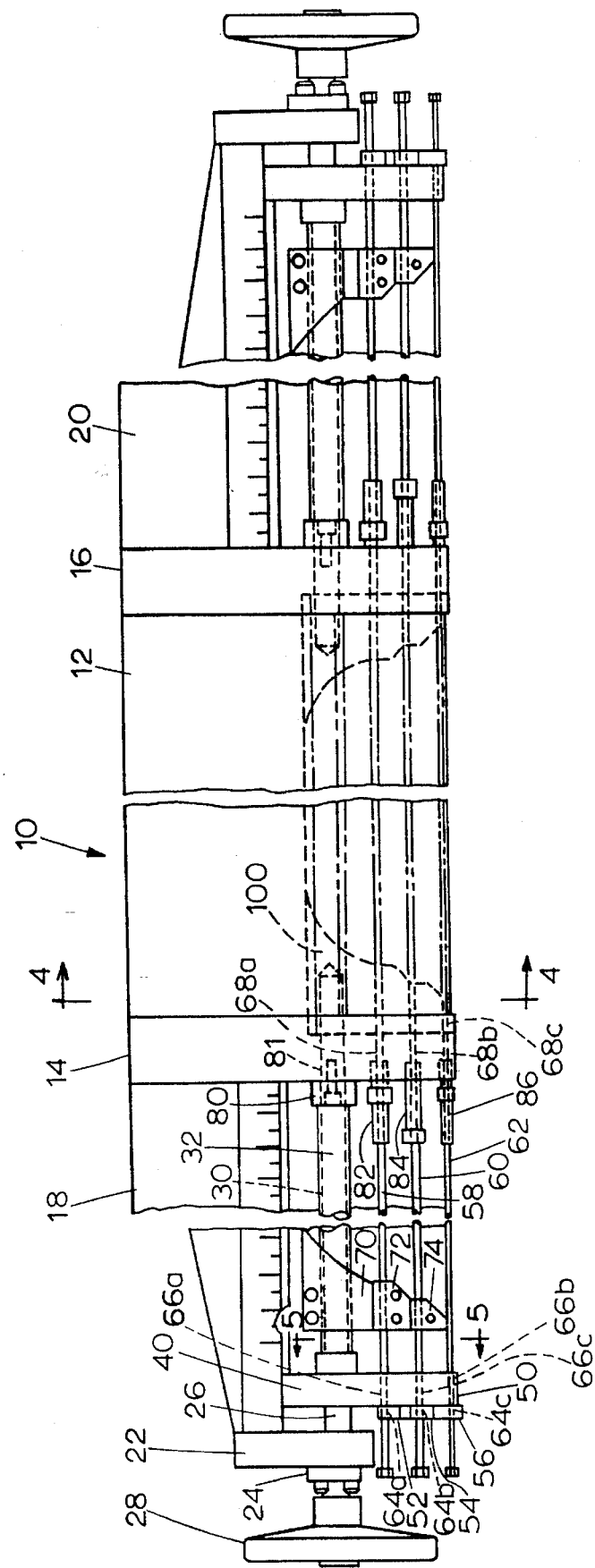
FIG. 1 comprises a fragmentary elevational view, partly in phantom, illustrating the extrusion die of the present invention.
Figure 2:
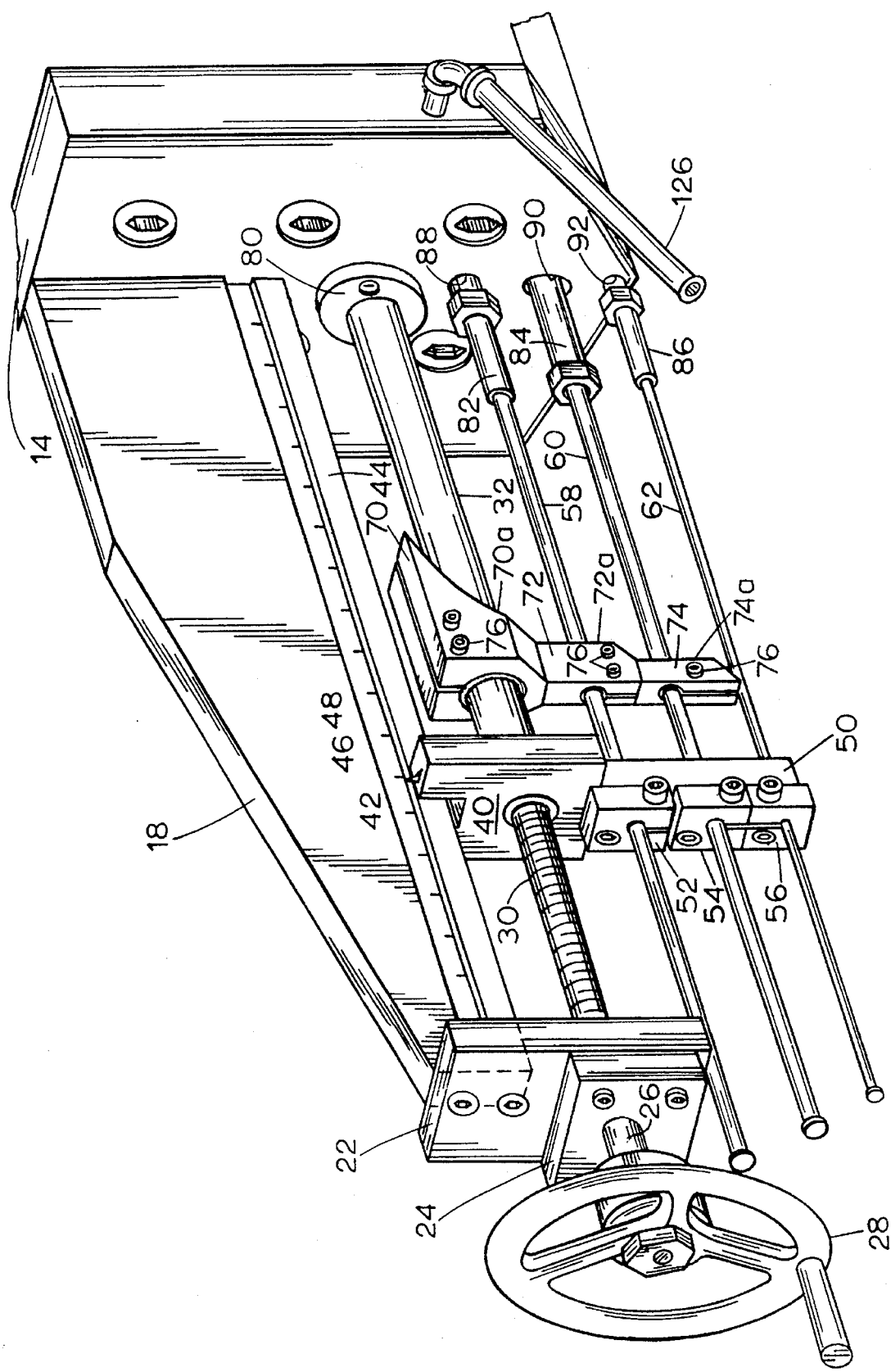
FIG. 2 comprises a fragmentary perspective view of an outer portion of the extrusion die of FIG. 1.
Figure 5:
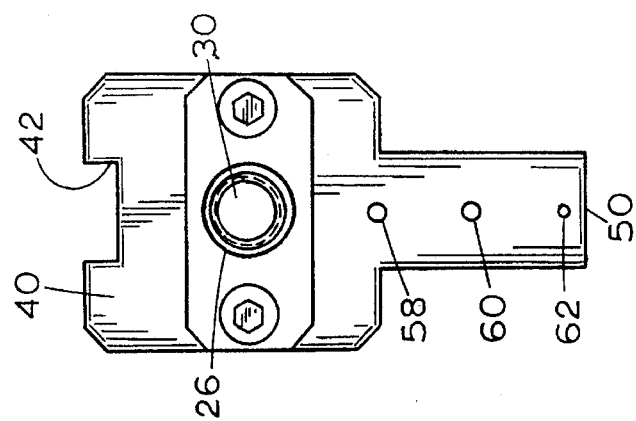
FIG. 5 comprises a sectional view taken generally along the lines 5—5 illustrating one of the bearing blocks of FIG. 1.

Referring now to FIG. 1, an extrusion die 10 includes a main body 12 and end plates 14, 16, secured thereto, for example, by bolts. First and second support structures 18, 20 are secured to the end plates 14, 16 respectively, by any suitable means, such as by welding. Referring also to FIG. 2, the support structures 18, 20 and the various items carried thereby are identical, and hence only the support structure 18 and associated components on the left side of the die shown in FIG. 1 will be described in detail. Mounted on the support structure 18 by bolts or other suitable means is an end support plate 22. A bearing plate 24 is mounted on the end support plate 22, again by bolts or any other suitable means. An elongate rod 26 extends through a bore in the plate 24 and is rotatable by means of a hand wheel 28 secured thereto. The rod 26 includes a portion 30 which extends into and engages interior threads of a sleeve 32. Mounted on the sleeve 32 is a guide plate 40 wherein the latter includes a notched portion 42 that partially surrounds a lower portion 44 of the support structure 18. A pointer 46 is disposed on the guide plate 40 and is located adjacent a scale 48 disposed on the support structure 18. The pointer 46 indicates the axial position of the support plate 40 as noted in greater detail hereinafter.

The support plate 40 further includes a lower depending portion 50 on which are mounted three rod clamps 52, 54 and 56. Three rods 58, 60 and 62 extend through a first set of aligned bores 64a–64c in the clamps 52, 54 and 56, respectively, a second set of aligned bores 66a–66c in the depending portion 50 and a third set of aligned bores 68a–68c in the end plate 14 into the main body 12 of the die 10. First, second and third plug indicators 70, 72, and 74 are disposed on the sleeve 32 and the rods 58, 60 respectively. Each of the indicators, 70, 72, and 74 is split and each indicator 70–74 is fixed on the sleeve 32 and the rods 58, 60 by cap screws 76 extending through the indicator.

The sleeve 32 extends through a collar 80 secured to the end plate 14 and further extends through a bore 81 in the plate 14 into the interior of the main body 12. The rods 58–60 and 62 extend through sleeves 82, 84 and 86, respectively which are in turn threaded into threaded shouldered portions 88, 90 and 92 of the bores 68a–68c, respectively, in the end plate 14.

Figure 3:
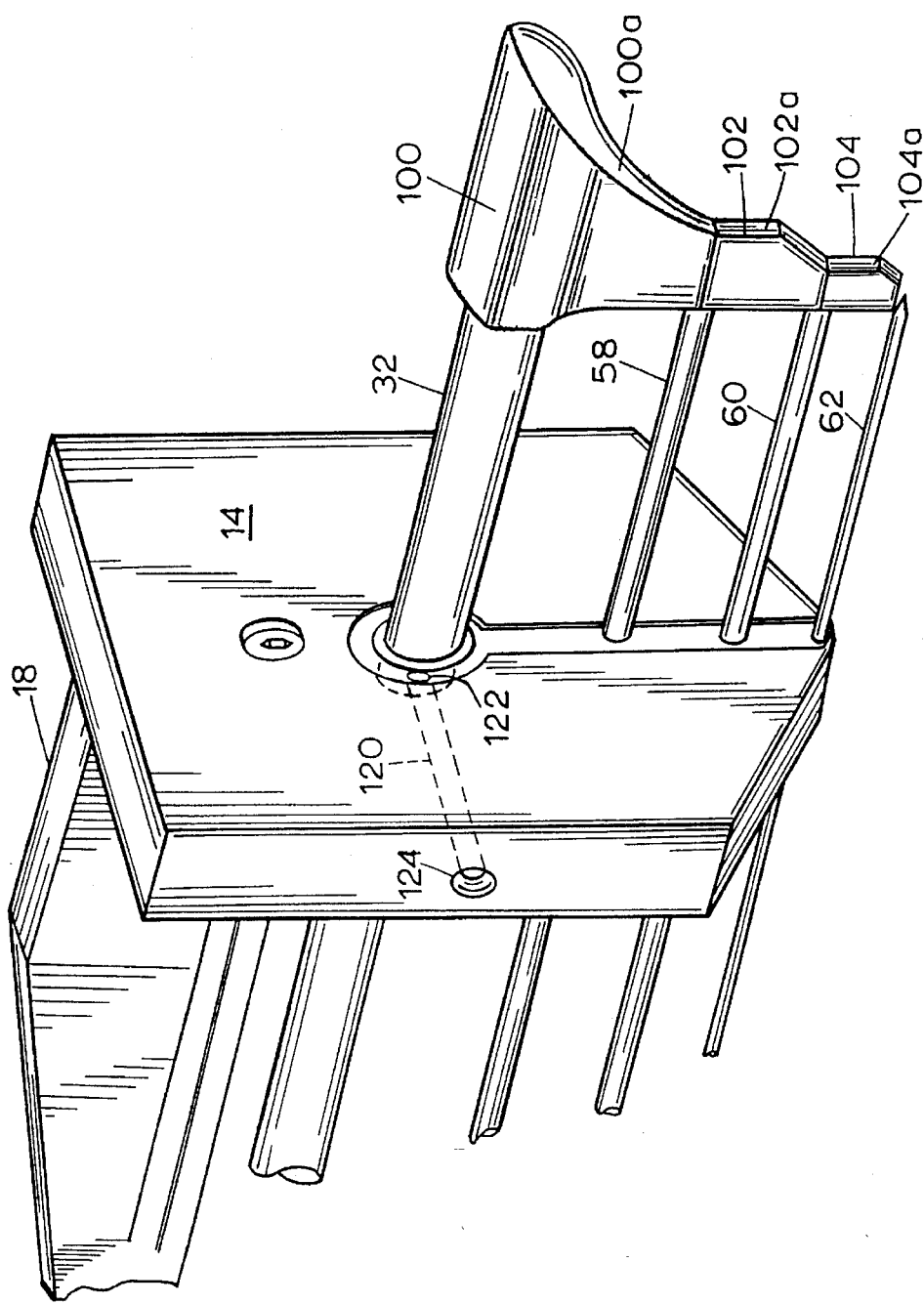
FIG. 3 comprises a fragmentary perspective view of an inner portion of the extrusion die of FIG. 1.

Referring also to FIG. 3, a first or uppermost plug 100 is secured to an end of the sleeve 32. A second or middle plug 102 is mounted on and carried by the rod 58 while a third or lowermost plug 104 is mounted on and carried by the rod 60. The plugs 100, 102, 104 are shaped to fit within a manifold 108 of the die 10, FIG. 4, and substantially prevent the flow of molten material to portions of the manifold located between the plugs 100, 102, 104 and the end plate 14. The rod 62 comprises a deckle rod which, together with the plugs 100–104, permits the width of the extruded product to be precisely controlled and which can be adjusted to minimize edge beading of the extruded product. The relative positions of the plugs 100, 102, 104 and the rod 62 may be adjusted by means of the clamps 52, 54 and 56. For example, the clamp 52 may be loosened and the rod 58 axially moved to adjust the position of the plug 102 relative to the plugs 100, 104 and the rod 62 within the manifold 108. Likewise, the positions of the plugs 104 and the rod 62 may be adjusted by loosening the clamps 54 and 56, thereby permitting axial movement thereof. Once the plugs 102, 104 have been moved to a desired position relative to the plug 100 and once the rod 62 is accurately positioned, the clamps 52–56 may be tightened to maintain such relative placement. All of the plugs 100–104 and the rod 62 may be moved together in unison by turning the hand wheel 28, thereby axially displacing the sleeve 32 and hence the support plate 40. This, in turn, causes movement of the clamps 52–56, and hence the rods 58–62.

The relative placement of the plugs 100–104 is indicated by the indicators 70–74. Each of the indicators 70, 72 and 74 includes an indicating edge 70a, 72a and 74a, respectively, which is shaped substantially identical to plug edges 100a, 102a and 104a of the plugs 100, 102 and 104, respectively. Thus, an operator can visually determine the relative placement of the plugs 100–104 by observing the indicators 70–76. An indication of the absolute axial position of the plugs 100–104 and the rod 62 may be obtained from the scale 48.

In addition to the foregoing, an exhaust port 120 (seen in FIG. 2) through the end plate 14 extends between first and second holes 122, 124 in the end plate 14 and permits the escape of stagnant molten material from the space between the plugs 100–104 and the end plate 14. A hose or other conduit 126 (FIG. 2) may be used to lead the exhausted material away from the die 10.

Each of the rods 58, 60 and 62 has an outer diameter slightly less than the inner diameter of the sleeves 82, 84, 86 and the bores 68a–68c in the end plate 14 so that an annular space is formed therebetween. This permits the gradual escape of molten material within the manifold 108 into the annular space whereupon the molten material may harden. This provides a seal against further escape of molten material in a simple and inexpensive fashion.

Figure 4:
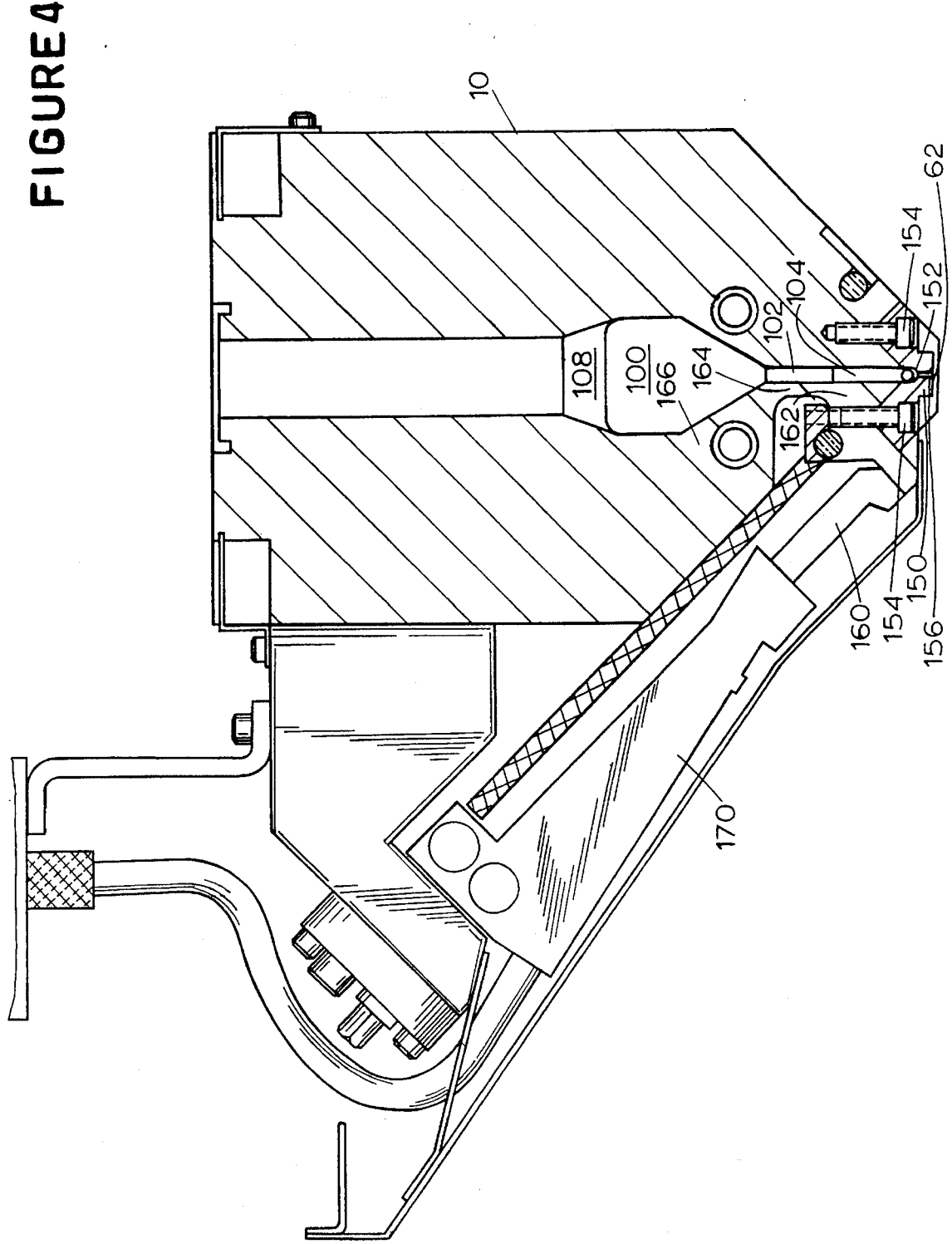
FIG. 4 comprises a sectional view taken generally along the lines 4—4 of FIG. 1.

Referring now to FIG. 4, mounted on the die 10 are a pair of replaceable lip inserts 150, 152 which are held in place on the die 10 by means of bolts 154. The lip inserts 150, 152 are made of hardened steel which are capable of withstanding the corrosive effects of extruded product. The lip inserts 150, 152 are replaceable so that they can be replaced when worn out or when it is desired to change the configuration of a die output slot 156, for example, when certain types of materials are to be extruded. The width of the slot 156 between the lip inserts 150, 152 can be precisely controlled by a thermally responsive member in the form of a rod or a bolt 160 which is mechanically coupled to a heel portion 162 of the die 10. The heel portion is joined by a hinge portion 164 to a main body 166 of the die 10. The hinge portion 164 permits the heel portion 162 to be moved by thermal expansion and contraction of the bolt 160 so that the width of the slot 156 can accurately controlled. The bolt 160 is heated by an electric heater 170 into which the bolt 160 extends.

The basic principles detailing operation of the lip gap opening and closing apparatus is disclosed in Nissel, U.S. Pat. No. 3,940,221 the disclosure of which hereby incorporated by reference herein.

In summary, the die 10 according to the present invention includes various features which render the die simple to use and maintain and which permit fabrication of high quality product in an efficient fashion.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

I claim:

1. An extrusion die, comprising:

a die body defining a manifold therein terminating at an outlet;

first and second relatively movable plugs positioned in the manifold away from said outlet each having a plug edge wherein the plug edges together define a substantially continuous axial edge profile;

means extending through the die body for moving the first and second plugs to first and second axial plug positions, respectively, in the manifold, said moving means comprising first and second rods which carry the first and second plugs, respectively: and means positioned on the moving means outside of the die body for indicating the first and second axial plug positions and the substantially continuous edge profile, wherein the indicating means comprises first and second members mounted on the first and second rods, respectively, having first and second indicating edges substantially identical in shape to the plug edges of the first and second plugs, respectively.

2. The extrusion die of claim 1, further including a deckle rod positioned in the manifold and movable with respect to the first and second plugs.

3. The extrusion die of claim 2, wherein the deckle rod is carried by the moving means.

4. The extrusion die of claim 1, further including a third movable plug moved by the moving means to a third plug position in the manifold wherein the indicating means indicates the third plug position.

5. The extrusion die of claim 1, wherein the first and second rods extend through first and second bores in the die body wherein each bore is of a size larger than the rod extending therethrough such that a space is located therebetween and wherein material flowing through the manifold can flow into and seal off the spaces between the rods and the bores.

6. The extrusion die of claim 1, wherein the outlet is of an adjustable size and further including means for controllably adjusting the outlet size.

7. The extrusion die of claim 6, wherein the die body includes a hinged member which is movable to adjust the outlet size and wherein the adjusting means includes a thermally-responsive member coupled to the hinged member and a thermal element in heat-transfer relationship with the thermally-responsive member wherein transfer of heat between the thermal element and the thermally-responsive member causes movement of the hinged member.

8. The extrusion die of claim 1, wherein the die body includes replaceable lip inserts wherein the outlet is defined by the lip inserts.

9. An extrusion die, comprising:

a die body defining a manifold therein terminating at an outlet;

first, second and third relatively movable plugs positioned in the manifold away from said outlet and each having a plug edge wherein the plug edges together define a substantially continuous axial edge profile;

first, second and third rods extending through the die body and supporting the first, second and third plugs at first, second and third plug positions, respectively, in the manifold; and first, second and third indicating members positioned on the first, second and third rods, respectively, outside of the die body for indicating the first, second and third plug positions, wherein the first, second and third indicating members respectively include first, second and third indicating edges substantially identical in shape to the first, second and third plug edges, respectively, which together indicate the substantially continuous axial edge profile.

10. The extrusion die of claim 9, further including a deckle rod positioned in the manifold and movable with respect to the first, second and third plugs.

11. The extrusion die of claim 10, wherein the outlet is of an adjustable size and further including means for controllably adjusting the outlet size.

12. The extrusion die of claim 11, wherein the die body includes a hinged member which is movable to adjust the outlet size and wherein the adjusting means includes a thermally-responsive member coupled to the hinged member and a thermal element in heat-transfer relationship with the thermally-responsive member wherein transfer of heat between the thermal element and the thermally-responsive member causes movement of the hinged member.

13. The extrusion die of claim 11, wherein the first through third rods extend through first through third sleeves, respectively, and first through third bores, respectively, in the die body wherein each bore and sleeve is of a size larger than the rod extending therethrough such that a space is located therebetween and wherein material flowing through the manifold can flow into and seal off the spaces between the rods and the sleeves and bores.

14. The extrusion die of claim 11, wherein the die body includes replaceable lip inserts wherein the outlet is defined by the lip inserts.

15. The extrusion die of claim 11, further including means for moving the plugs, rods and indicating members.

16. An extrusion die, comprising:
 a die body defining a manifold therein terminating at an outlet of an adjustable size wherein the die body includes a hinged member which is movable to adjust the outlet size;
 first, second and third relatively movable plugs positioned in the manifold away from the outlet each having a plug edge wherein the plug edges together define a substantially continuous axial edge profile;
 a deckle rod positioned in the manifold and movable with respect to the first, second and third plugs;
 first, second and third rods extending through the die body and supporting the first, second and third plugs at first, second and third plug positions, respectively, in the manifold; and
 first, second and third indicating members having first, second and third indicating edges, respectively, substantially identical in shape to the plug edges of the first, second and third plugs, respectively, positioned on the first, second and third rods, respectively, outside of the die body for indicating the first, second and third plug positions and the substantially continuous axial edge profile; and
 means for controllably adjusting the outlet size including a thermally-responsive member coupled to the hinged member and a thermal element in heat-transfer relationship with the thermally-responsive member wherein transfer of heat between the thermal element and the thermally-responsive member causes movement of the hinged member.

17. The extrusion die of claim 16, further including means for moving the plugs, rods and indicating members.

18. The extrusion die of claim 17, wherein the first through third rods extend through first through third sleeves, respectively, and first through third bores, respectively, in the die body wherein each bore and sleeve is of a size larger than the rod extending therethrough such that a space is located therebetween and wherein material flowing through the manifold can flow into and seal off the spaces between the rods and the sleeves and bores.

19. The extrusion die of claim 18, wherein the die body includes replaceable lip inserts wherein the outlet is defined by the lip inserts.

20. An extrusion die, comprising:
 a die body including a pair of opposing walls defining a manifold therein terminating at an outlet of an adjustable size, and wherein the die body includes an outlet member which is movable about a hinge to adjust the outlet size;
 a moveable flow restriction member positioned in the manifold in contact with the pair of opposing walls and away from the outlet and having a restriction edge which is shaped to substantially conform to the pair of walls of the die body along said manifold and extending toward said outlet to prevent the flow of material between said restriction member and both said manifold and said die body walls;
 means extending through and outside the die body for moving the flow restriction member; and
 means coupled to the outlet member for controllably adjusting the outlet size by moving said outlet member about said hinge.

21. The extrusion die of claim 20, wherein the adjusting means includes a thermally-responsive member coupled to the outlet member and a thermal element in heat-transfer relationship with the thermally-responsive member wherein transfer of heat between the thermal element and the thermally-responsive member causes movement of the outlet member.

22. The extrusion die of claim 20, further including means positioned outside of the die body for determining the axial position of the flow restriction member.

23. The extrusion die of claim 22, wherein the positioning means includes an indicating scale.

24. The extrusion die of claim 20, wherein the die body further includes an end plate through which the moving means extend and wherein the restriction edge substantially prevents material flowing through the manifold from flowing between the restriction edge and the end plate.

25. The extrusion die of claim 20, including first and second movable flow restrictor members each having a restriction edge wherein the restriction edges together define a substantially continuous edge profile.

26. The extrusion die of claim 25, wherein the first and second relatively movable flow restriction members are in contact with one another.

27. An extrusion die comprising:
 a die body defining a manifold therein terminating at an outlet of an adjustable size, and wherein the die body includes a hinged member which is movable to adjust the outlet size;
 first and second relatively moveable flow restriction members positioned in the manifold away from the outlet each having a restriction edge wherein the restriction edges together define a substantially continuous axial edge profile;
 means extending through and outside the die body for moving the first and second flow restriction members, means positioned on the moving means outside of the die body for indicating the first and second restriction member positions and the substantially continuous axial edge profile, wherein the indicating means comprises first and second members having first and second indicating edges substantially identical in shape to the restriction member edges of the first and second restriction members, respectively; and
 means for controllably adjusting the outlet size.

28. The extrusion die of claim 27, wherein the adjusting means includes a thermally-responsive member coupled to the hinged member and a thermal element in heat-transfer relationship with the thermally-responsive member wherein transfer of heat between the thermal element and the thermally-responsive member causes movement of the hinged member.

29. The extrusion die of claim 28, wherein the die body further includes an end plate through which the moving means extend and wherein the substantially continuous edge profile substantially prevents material flowing through the manifold from flowing between the substantially continuous edge profile and the end plate.

30. The extrusion die of claim 27, wherein the first and second relatively movable flow restriction members are in contact with one another.

* * * * *